April 7, 1959 M. G. PAWLEY ET AL 2,881,244

SUBSCRIBER TELEVISION SYSTEM WITH CODE RESET BURSTS IN AUDIO CHANNEL

Filed Aug. 30, 1951 3 Sheets-Sheet 1

INVENTORS

Myron G. Pawley

Jacob M. Sacks,

BY J. Richard Paris ATTORNEY

INVENTORS
Myron G. Pawley
Jacob M. Sachs,
BY J. Richard Paris
ATTORNEY

INVENTORS
Myron G. Pawley
Jacob M. Sacks,
BY I. Richard Paris
ATTORNEY 2,881,244

SUBSCRIBER TELEVISION SYSTEM WITH CODE RESET BURSTS IN AUDIO CHANNEL

Myron G. Pawley, Alexandria, Va., and Jacob M. Sacks, Silver Spring, Md., assignors, by direct and mesne assignments, to Zenith Radio Corporation, a corporation of Delaware Application August 30, 1951, Serial No. 244,336

1 Claim. (Cl. 178—5.1)

The present invention relates generally to television systems of the subscriber type, in which the telecast image is distorted so that in order to receive an undistorted image the receiver needs to be provided with devices which correct the distortion. More particularly the present invention relates to the type of subscribers television system in which a variable coding apparatus is employed at the telecasting station and the receiver is provided with a similar coding unit which may be adjusted in agreement with the code employed by the telecaster thereby to receive a normal or corrected image. A system of this type is described and claimed in our co-pending application, Ser. No. 230,618, filed June 8, 1951, and issued Dec. 10, 1957, as Patent 2,816,156, and the system described and shown therein is hereby embodied in the present application and is made a part hereof. In this system the coding unit at each subscriber's station must be maintained in synchronism or in step with the coding unit or coding system at the telecasting station. For this purpose a code synchronization pulse, sometimes referred to in the above mentioned application as a reset or as a recycle pulse, is generated at the telecasting station and is applied periodically to the coder or to the coding system, and is also transmitted and received by the subscriber's receiver and there applied similarly to the subscriber's coder unit or coding system. By means of this coding synchronization pulse or reset pulse the coding units at all receivers' stations are maintained in step or in synchronism with the coding unit at the transmitter. This, taken together with the adjustment of the subscriber's coding unit, all as described in the above mentioned co-pending application, results in generating a code at the receiver which is identical with the code generated at the transmitter and is in phase or in synchronism with it. Thus the image received is free of distortion.

In the system as shown in the above mentioned application, the reset pulse is transmitted in the video envelope. This may, under some conditions, be undesirable. The present invention, therefore, provides for the transmission of the reset or recycle pulse in the audio envelope.

It is thought unnecessary to describe the system shown in the above application and the present specification will be directed primarily to the changes which are introduced into the system by the present invention which will become clear from the accompanying drawings and the following description.

Figure 1:
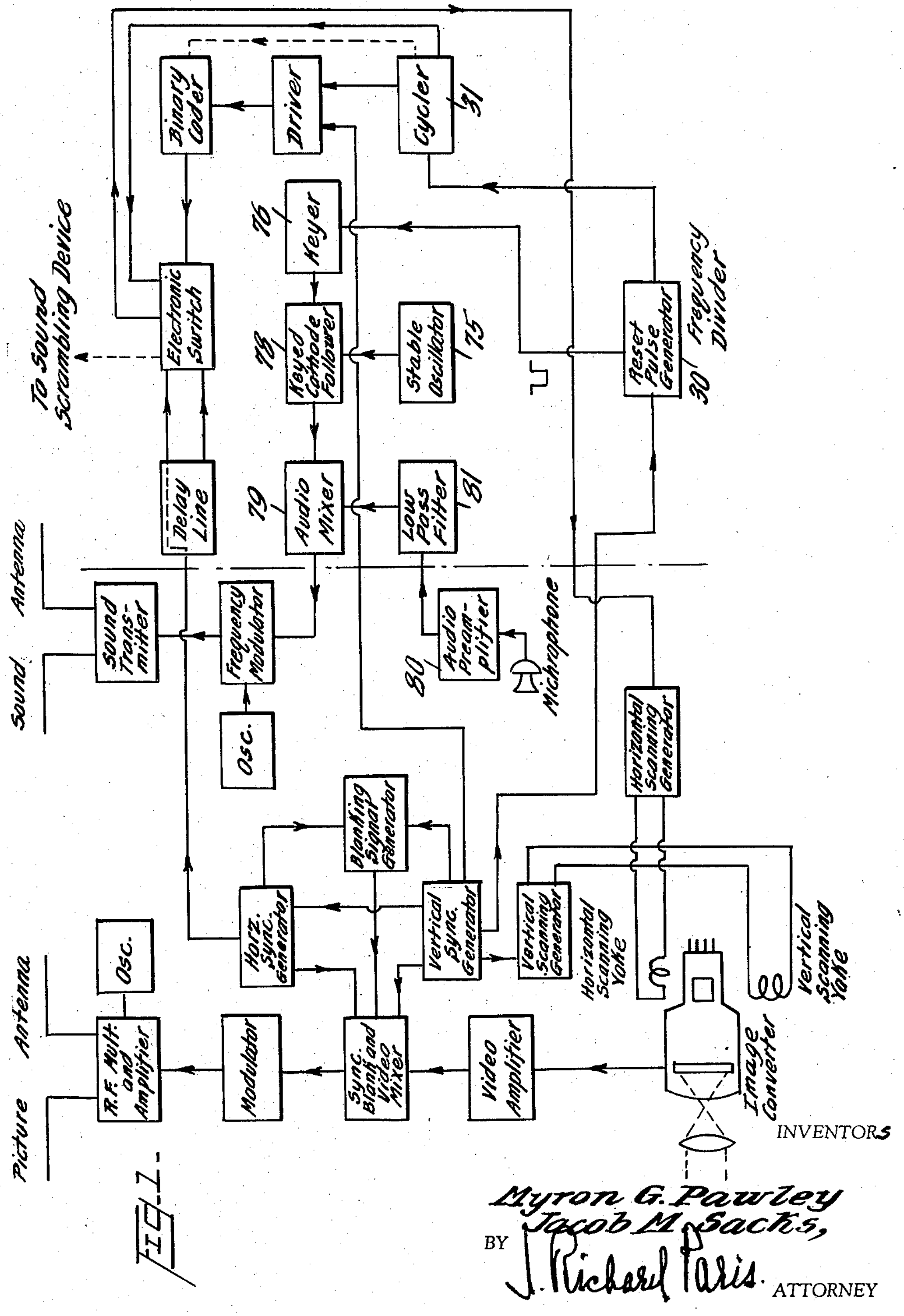
Fig. 1 is a schematic drawing of a transmitter embodying the present invention.

In its broader aspects, the present invention provides for generating and transmitting a burst of cycles which are within the FM range employed in broadcasting the audio component, but which are super-audible. In the present specification 17 kc. will be employed as illustrative. For this purpose, a stable oscillator generating the desired frequency is employed and means are provided, such as a keyed cathode follower, the keyer being under the control of the frequency divider or reset pulse, to permit only a periodic burst or pulse to be delivered to the audio mixer. To facilitate the understanding of the transmitter embodying the present invention, Fig. 1 herein reproduces Fig. 1 of the co-pending application as modified by the present invention.

In the system shown in the co-pending application the reset pulse generator 30 is connected to the video mixer through a reset pulse coder for the purpose of transmitting the reset pulse in the video envelope. In the present invention the reset pulse coder is eliminated and so is the connection from the reset pulse generator 30 to the video mixer 12. In lieu thereof the reset pulse generated at 30 is employed for controlling or keying the operation of the cathode follower 78 which is connected to the output of the stable oscillator 75 in the manner that, simultaneously with the transmission of the pulse from the reset pulse generator 30 to the cycler 31, the cathode follower 78 delivers a 17 kc. burst or pulse which is mixed with the audio signal and is transmitted in the audio envelope. At the receiver this burst or pulse is separated from the audio signal and is converted into a square wave reset pulse which is employed in the same manner as in the system of the above application.

Figure 3:
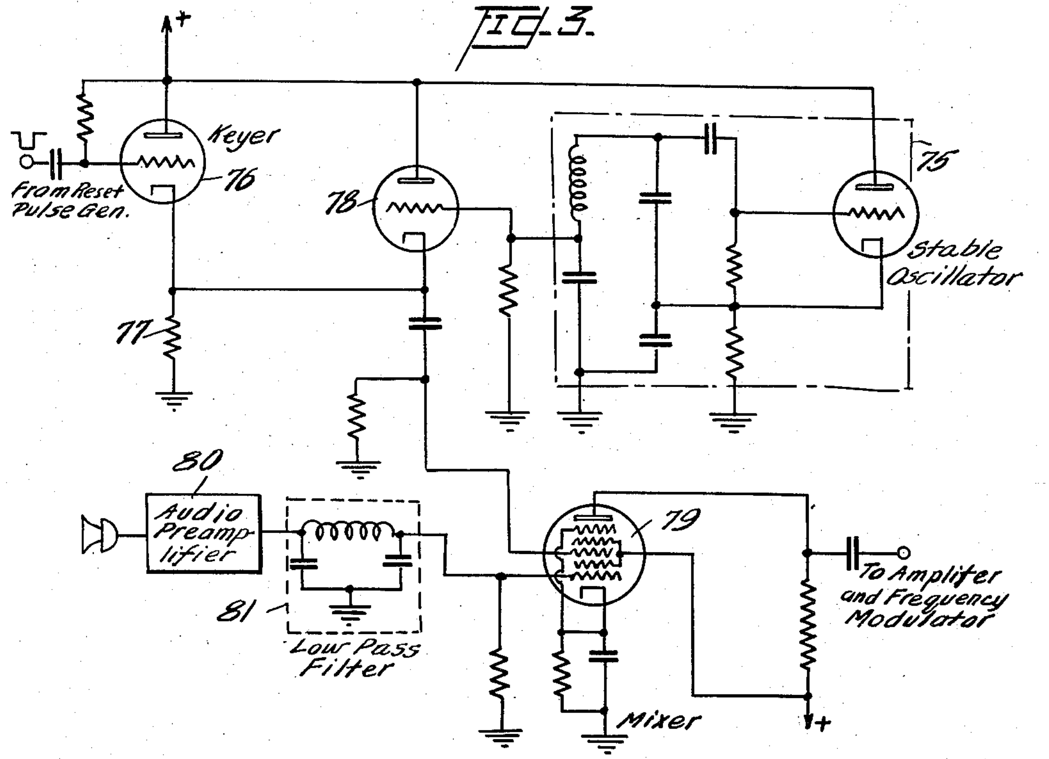
Fig. 3 is a wiring diagram of the novel parts of the transmitter.
Figure 4:
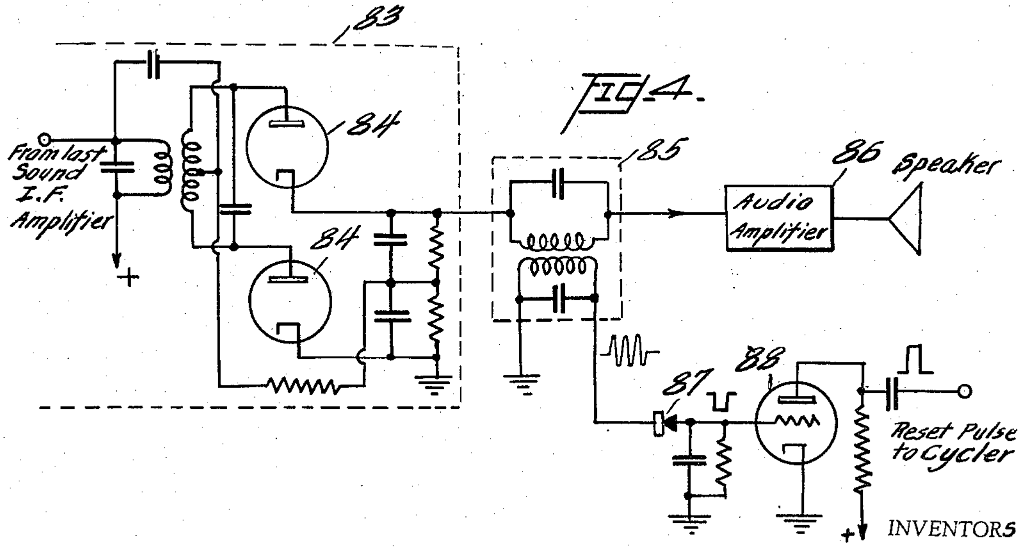
Fig. 4 is a wiring diagram of the novel parts of the receiver.

The cathode follower 78 connected to the stable oscillator 75 (see Fig. 3) is controlled by the triode keyer 76, the relationship between the two being such that when the keyer 76 is conducting the cathode follower 78 is inoperative because the keyer draws heavy current through resistance 77 which imposes a high positive bias on the cathode of the cathode follower and thereby maintains it in its cut-off condition. In the system, the keyer is normally conductive and the cathode follower is therefore normally ineffective. However, periodically the reset pulse generated at 30 is delivered to the grid of the keyer 76 in the form of a negative square pulse as shown. This cuts the keyer off and thus permits the cathode follower 78 to operate during the duration of the reset pulse. The oscillator 75 during this period of time supplies through the C.F. a burst or pulse or group of cycles of the desired frequency and this pulse is now delivered to the audio mixer 79. The audio signal is also delivered to the mixer 79 from the conventional audio devices 80, a low pass filter 81 being interposed between the audio apparatus 80 and the mixer 79 which is designed to prevent the entry into the mixer 79 of any frequencies above approximately 16 kc., so as to eliminate interference with the recycle pulse of 17 kc. which is delivered to the mixer 79. The signal delivered by the mixer 79, which includes the audio signal and the 17 kc. recycle pulse, is delivered to the conventional audio apparatus 82 which may include the amplifier modulator and the antenna, etc.

It will now be understood that the recycle pulse or reset pulse which is derived from the vertical synchronizing pulse of the video system is employed at the transmitter directly for the control of the coding system at the transmitter, but is converted into a pulse which is included with the audio envelope and is transmitted with the audio envelope instead of being transmitted with the video envelope as in the system shown in the co-pending application.

Figure 2:
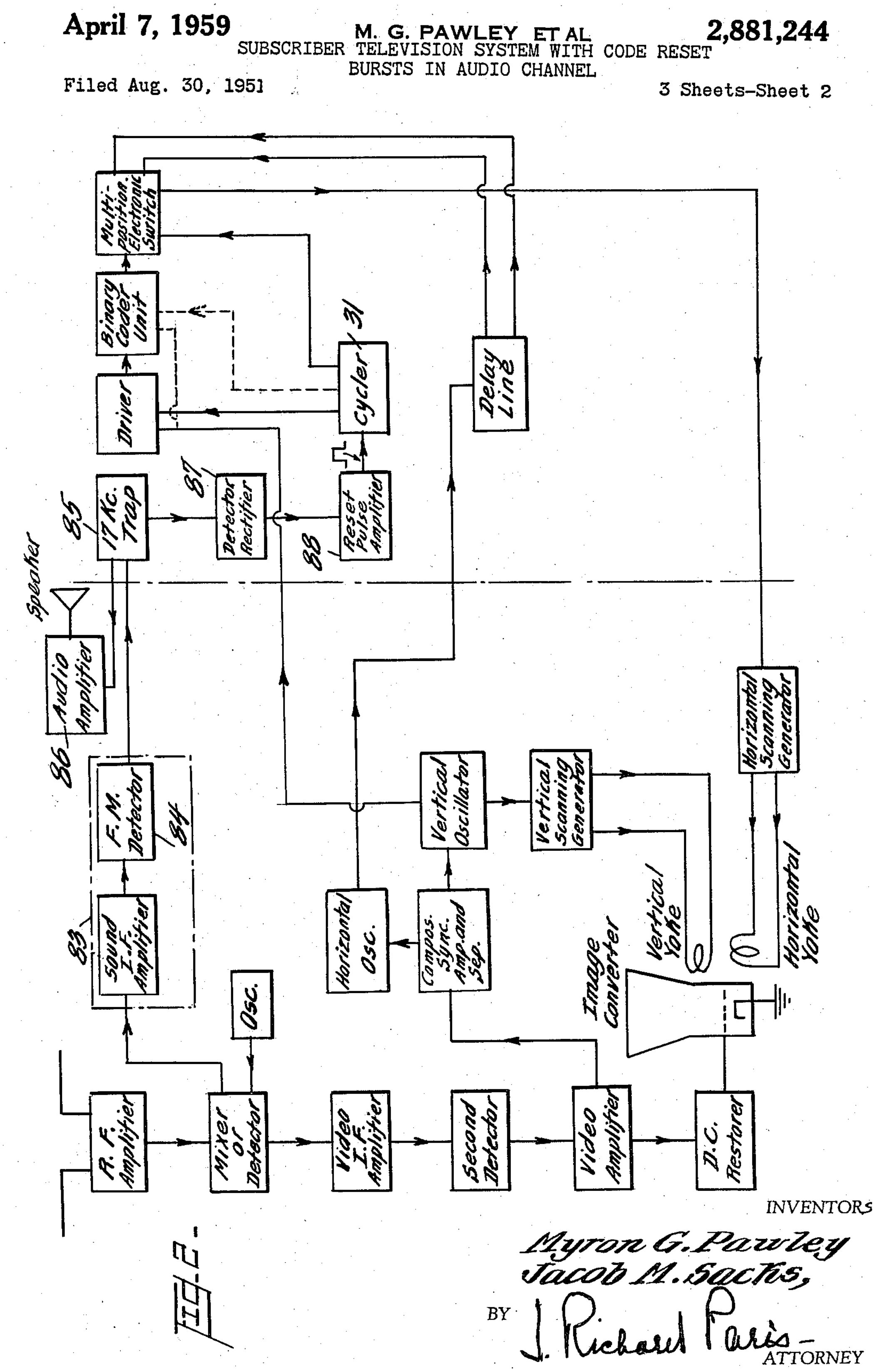
Fig. 2 is a similar showing of a receiver.

At the receiver the 17 kc. pulse is readily converted into a square wave reset pulse which is employed in the manner shown in the co-pending application. In order to facilitate the understanding of the operation of the receiver, Fig. 2 of the drawings in the co-pending application is reproduced herein as modified by the present invention. Whereas in the co-pending application the cycler derived its pulses from the video apparatus, in the present invention it derives its pulse from the audio components of the receiver. Thus the audio receiver generally is shown at 83 and is represented particularly by the FM detector 84 which is conventional in FM audio receivers. Thus the detector 84 delivers the audio signal and the reset pulse. The trap 85 is tuned to the frequency of the reset pulse, 17 kc. in the present case, and separates this pulse from the audio signal which is delivered to the conventional sound amplifier and speaker 86. The reset pulse or burst is delivered by 85 to the detector rectifier 87 which converts the same into a negative D.C. pulse delivered to the amplifier 88, which in turn delivers a positive square wave reset pulse as shown to the cycler 31 which in its turn delivers the same to the coding system so as to maintain it in synchronism with the coding system of the transmitter.

The present invention, it will now be seen, frees the video system from the reset pulse, which instead is transmitted with the audio component in the audio envelope. As previously, the reset pulse is derived from the vertical synchronizing pulse by the frequency divider. From this point, instead of, as previously, double coding the reset pulse to insert it into the video mixer and into the video component and decoding it at the receiver in the video component, the present invention provides for converting the reset pulse into a pulse or burst of pulses of a frequency that renders it compatible with the audio signal and the same is mixed with the audio signal and radiated with it. At the receiver the reset pulse in the form of a burst of pulses is separated from the audio signal and converted into a square wave for application to the coding system at the receiver and thus synchronizing it with the coding system at the transmitting station.

Having described our invention, we do not wish to limit it to the specific embodiment shown herein. The invention as defined in the appended claim covers all modifications that fall within the spirit and scope of the invention.

We claim:

A television system comprising: a television transmitter including a cyclically operating variable coding system, means for repetitively producing coding system reset pulses for resetting the cyclical operation of said coding system, means for transmitting a television signal including abnormal coded video signals, audio signals, regularly repetitive vertical synchronizing pulses and regularly repetitive horizontal synchronizing pulses, and means for incorporating said coding system reset pulses in said audio signals to constitute specially coded repetitive reset pulses; and a plurality of receivers each of which comprises a picture converter synchronized in operation relative to said video signals by said synchronizing pulses, a cyclically operating variable decoding system, means responsive to the special coding of said reset pulses for separating said reset pulses from other components of said television signal, means for supplying said reset pulses to said decoding system for synchronizing its cyclical operation with the code of said abnormal coded video signals, and means responsive to the decoding system and cooperating with said picture converter to convert said abnormal coded video signals into a normal picture.

References Cited in the file of this patent

UNITED STATES PATENTS

| | | |
|---|---|---|
| 2,510,046 | Ellett | May 30, 1950 |
| 2,567,539 | Aram | Sept. 11, 1951 |
| 2,570,187 | Aram | Oct. 9, 1951 |
| 2,574,462 | Brown | Nov. 13, 1951 |
| 2,619,530 | Roschke | Nov. 25, 1952 |
| 2,649,498 | Ellett | Aug. 18, 1953 |
| 2,656,406 | Gray et al. | Oct. 20, 1953 |
| 2,757,226 | Zworykin | July 31, 1956 |
| 2,816,156 | Pawley et al. | Dec. 10, 1957 |